(12) United States Patent
Byers et al.

(10) Patent No.: US 6,993,238 B2
(45) Date of Patent: Jan. 31, 2006

(54) ROUTING OF OPTICAL FIBER THAT EXITS FROM THE FRONT OF CIRCUIT BOARDS IN AN ELECTRONIC SHELF

(75) Inventors: Charles Calvin Byers, Wheaton, IL (US); Albert Holliday, Langhorne, PA (US); Claudio Spinelli, Staten Island, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 139 days.

(21) Appl. No.: 10/772,957

(22) Filed: Feb. 5, 2004

(65) Prior Publication Data

US 2005/0175293 A1    Aug. 11, 2005

(51) Int. Cl.
*G02B 6/00*    (2006.01)
(52) U.S. Cl. .................. 385/135; 386/136; 386/134; 386/139
(58) Field of Classification Search ............. 385/134, 385/135, 136, 137, 139, 88, 92
See application file for complete search history.

(56) References Cited

U.S. PATENT DOCUMENTS

| | | | | |
|---|---|---|---|---|
| 4,895,424 A | * | 1/1990 | Hughes | .................. 385/56 |
| 5,265,186 A | * | 11/1993 | Fishkin et al. | .............. 385/135 |
| 5,544,273 A | * | 8/1996 | Harrison | ..................... 385/135 |
| 5,576,938 A | * | 11/1996 | Beun | .......................... 361/829 |
| 5,907,654 A | * | 5/1999 | Render et al. | ............. 385/135 |
| 6,434,314 B1 | * | 8/2002 | Gatica et al. | ............... 385/136 |
| 6,600,866 B2 | * | 7/2003 | Gatica et al. | ............... 385/135 |

* cited by examiner

*Primary Examiner*—Brian M. Healy

(57) ABSTRACT

An electronic shelf contains a plurality of circuit board assemblies mounted adjacent each other. Each circuit board assembly includes a circuit board with an attached front faceplate having a recessed wall that defines a rearward extending recess between a bottom edge and a top edge of the circuit board. An optical fiber is connected to the circuit board. A bail is mounted adjacent each of the front faceplates, each bail being movable from a seated position to an extended position. The optical fibers are held by an associated bail at an intermediate location along a length of the optical fiber. The optical fibers have a first portion that is contained within the rearward extending recess with the associated bail in its seated position. The first portion of the optical fiber is pulled forwardly from within the recess and away from the associated front faceplate with the associated bail in its extended position. This arrangement facilitates the easy removal of a circuit board without optical fibers of other circuit boards being in the way.

20 Claims, 2 Drawing Sheets

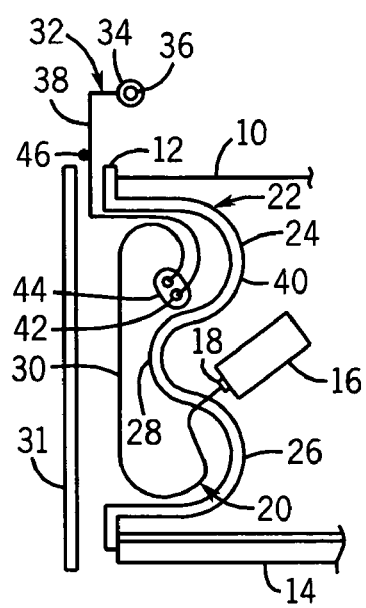
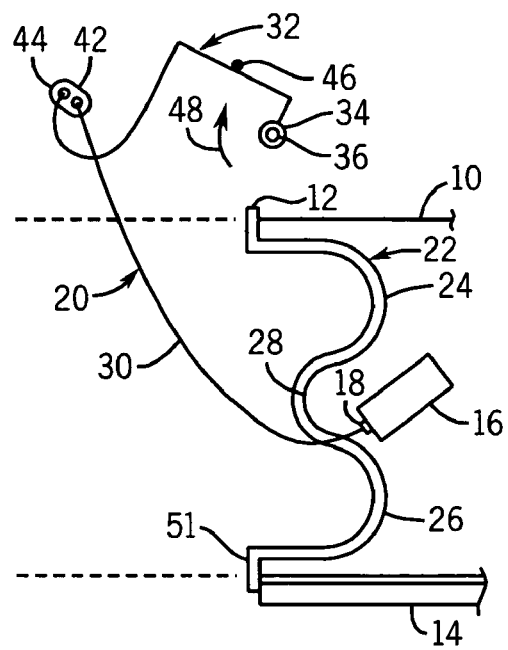
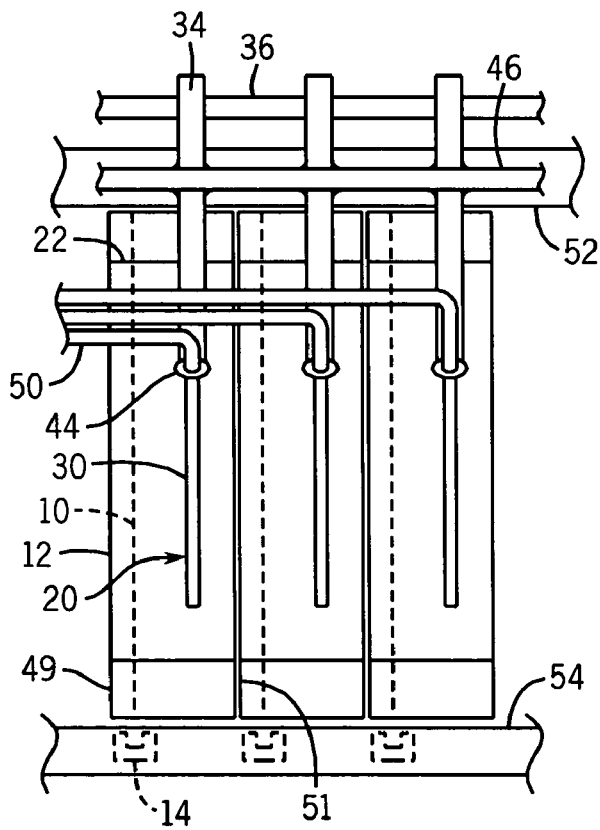
FIG. 1
FIG. 2
FIG. 3

ROUTING OF OPTICAL FIBER THAT EXITS FROM THE FRONT OF CIRCUIT BOARDS IN AN ELECTRONIC SHELF

BACKGROUND

This invention relates generally to electronic shelves and the routing of light conducting fiber that terminates on circuit boards contained in the electronic shelf. More specifically, this invention relates to the routing of light conducting fibers that must exit near the front faceplate of circuit boards in an electronic shelf where a narrow spacing between the front faceplate and the front of the cabinet housing the electronic shelf prevents the light fibers from exiting perpendicular to the front faceplate.

Electronic shelves are generally well-known that contain a plurality of circuit boards. Typically each circuit board is mounted in the electronic shelf by sliding it along a slot until the back edge of the circuit board engages a connector such as mounted to a backplane. Each circuit board contains a front faceplate that extends perpendicular to the plane of the circuit board. Each front faceplate is dimensioned to form a contiguous front panel along the electronic shelf when all slots within the shelf are occupied by circuit boards. This is advantageous since the front panel formed by the front faceplates of the circuit boards minimize unwanted radio frequency radiation that may be generated by the circuit boards and also form a substantially airtight seal along the front of the electronic shelf so that air used for forced-air cooling of the components on the circuit boards is not unintentionally lost through the front faceplates.

The high bandwidth available for conveying information by modulated light conducted along light carrying fiber may be desirable, if not required, to carry communications from a circuit board in an electronic shelf to another circuit board or other external electronic devices. There are significantly more conditions that must be met when connecting fiber to a circuit board as opposed to connecting metallic conductors to a circuit board. Fibers are normally connected to a circuit board by manual insertion involving a push-on, bayonet style or threaded end connector. This makes connecting fibers to the rear edge of the circuit board substantially more difficult especially when the circuit board is to be mounted within an electronic shelf. In such a situation, the fibers must either be attached prior to the insertion of the circuit board into the electronic shelf resulting in a substantial length of fiber that must be placed/dressed within the shelf at the time of mounting the circuit board, or manual access must be provided at the rear of the electronic shelf to permit the manual connection of the fiber to a corresponding receptor on the circuit board.

Providing fiber connector receptacles on the front faceplate of circuit boards provides for relatively easy installation and connection of fibers perpendicular to the front faceplate of the circuit boards. This provides a solution to the difficulties encountered when fiber connections are attempted at or near the rear of the circuit boards. However, this front mounting technique places certain requirements on the electronic shelf. A significant requirement is that there can be no front cover or other obstruction near the front faceplate of the circuit boards when seated within the electronic shelf. The fiber cannot be bent at a right angle and requires a minimum bend radius be maintained to prevent damage to the fiber and to avoid adversely affecting the light transmission characteristics.

Electronic shelves may not be designed to accommodate circuit boards that require fiber connections to the front of the circuit boards. For example, electronic shelf standards such as proposed by the Advanced Telecom Computing Architecture (AdvancedTCA) make it difficult, if not impossible, to accommodate circuit boards that require fiber connections to the front faceplates where the circuit board is long enough to cause its front faceplate to be only a short distance from the front door of the cabinet that houses the electronic shelf. This electronic shelf standard requires a front door that is spaced parallel to and only 95 millimeters from the front panel of circuit boards. When this front door is closed, it will make the routing/dressing of fiber extending perpendicular from the front faceplate of circuit boards difficult. Thus, there exists a need for an improved technique for managing the routing of fiber at the front of a circuit board to be housed in an electronic shelf with a nearby front door or other nearby physical obstruction.

SUMMARY OF THE INVENTION

It is an object of the present invention to provide a solution to the need for a design alternative to accommodate circuit boards that require fiber connections to the front of the circuit boards where there is limited space available.

In accordance with an embodiment of the invention, an electronic shelf contains a plurality of circuit board assemblies mounted adjacent each other. Each circuit board assembly includes a circuit board with an attached front faceplate having a recessed wall that defines a rearward extending recess between a bottom edge and a top edge of the circuit board. An optical fiber is connected to the circuit board. A bail is mounted adjacent each of the front faceplates, each bail being movable from a seated position to an extended position. The optical fibers are held by an associated bail at an intermediate location along a length of the optical fiber. The optical fibers have a first portion that is contained within the rearward extending recess when the associated bail is in its seated position. The first portion of the optical fiber is pulled forwardly from within the recess and away from the associated front faceplate with the associated bail in its extended position. Moving the bails to the extended positions permits the easy removal of a circuit board without optical fibers of other circuit boards being in the way.

BRIEF DESCRIPTION OF THE DRAWINGS

FIG. 1 is a side elevational view illustrating an embodiment of the present invention showing a circuit board assembly and its associated front connected fiber in a seated position within an electronic shelf.

FIG. 2 is a side elevational view illustrating the embodiment of the present invention as shown in FIG. 1 with the circuit board still seated within an electronic shelf but with the associated fiber in an extended position towards the front permitting the circuit board to be removed from electronic shelf.

FIG. 3 is a partial front elevational view of the embodiment of the present invention as shown in FIG. 1 showing a plurality of circuit board assemblies.

DETAILED DESCRIPTION

Figure 4:
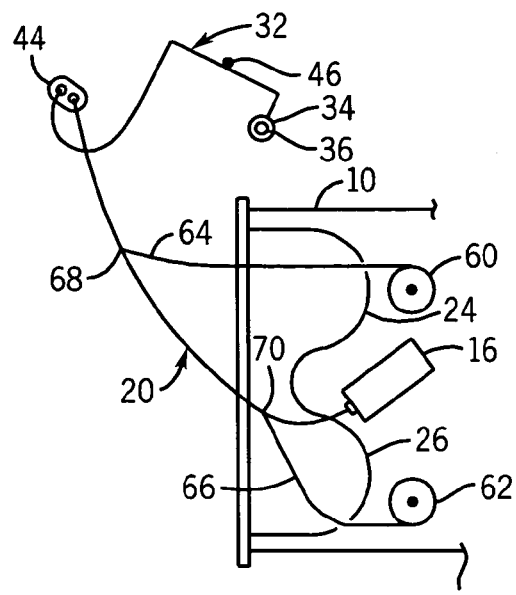
FIG. 4 is a side elevational view illustrating a further embodiment of the present invention.

FIG. 1 illustrates an embodiment of the present invention in which a circuit board 10 includes a front faceplate 12 and is supported by a rail 14 of an electronic shelf that slidingly receives the bottom edge of the circuit board 10. The circuit board 10 is shown in its fully seated position within the electronic shelf. An optical transceiver 16 is mounted to circuit board 10 and includes a connector 18 for terminating an end of optical fiber 20. A rearward recessed wall 22 in the front faceplate 12 may comprise a "half dog bone" cross-section as shown in FIG. 1 with rearward bulging portions 24 and 26 divided by a narrower section 28. The rearward recessed wall 22 of the front faceplate preferably comprises a thin strip of material, e.g. sheet metal, that will fulfill the requirements of preventing substantial airflow through the front faceplate and inhibiting the passage of radio frequency energy that may be generated by the circuit board. A small hole in the wall 22 near the connector 18 of the optical transceiver 16 permits the optical fiber 20 to pass through the rearward recess and be connected to the optical transceiver. Alternatively, a connector connected to optical transceiver 16 could be mounted to wall 22 to receive the connector 18 instead of using hole in the wall to permit the fiber to pass through. A cabinet (not shown) encloses the electronic shelf and its circuit boards, and has a front door 31 spaced a "short distance" from the front faceplate 12. A "short distance" means a distance short enough to prevent an optical fiber exiting perpendicular from the front faceplate 12 from completing a 90 degree turn before reaching the front door 31 while maintaining a minimum recommended bend radius of the optical fiber.

In the illustrative embodiment, a first portion of the optical fiber 20 is routed to generally conform with the half dog bone shape so that the portion of the fiber adjacent bulging portions 24 and 26 are more rearward than central portion 30 of the fiber which is substantially parallel to and adjacent the front surface of the faceplate 12. The volume defined by the half dog bone rearward recess 22 accommodates a substantial length of fiber, i.e. the first portion, to be contained within this volume while maintaining the required minimum bend radii for the fiber. The length of fiber required to be contained within this volume is sufficient to permit it to be extended when the bail (described below) is extended will be explained with regard to FIG. 2. The remainder of the fiber, i.e. a second portion, exits horizontally generally within the bulging portions 24 associated with a plurality of circuit boards. This remainder of the fiber remains rearward of the front surface of the front faceplates 12 of the other circuit boards while the bail is in the seated position as shown in FIG. 1.

A bail, i.e. a movable arm, 32 is pivotally mounted near its end 34 to a supporting rod or element 36. The bail 32 includes a portion 38 that is forward of the front faceplate 12 and another "hooked" portion 40 that extends within bulging portion 24 of rearward recess 22. The distal end 42 of bail 32 has connected thereto a support member 44 that engages, controls bend radius, and supports the optical fiber 20 as it begins its horizontal exit away from the circuit board 10. The bail 32 is shown in FIG. 1 in a seated position in which the hook portion 40 is substantially adjacent the rearward bulging portion 24 of recessed wall 22. In this position the fiber at support member 44 is held near the rearward recessed wall 22 with the remaining first portion of fiber disposed within the recess configured substantially to the half dog bone shape. A horizontal rigid rod 46 is attached to the portion 38 of the bail 32 and to each of the similarly disposed bails associated with adjacent circuit boards. This horizontal rod serves to connect each of the bails so that all of the connected bails can be pivoted in unison away from the circuit boards as will be described with regard to FIG. 2.

FIG. 2 shows the elements in the embodiment of FIG. 1 in an extended position in which the bail 32 has been rotated (pivoted) about 36 as indicated by arrow 48 while circuit board 10 remains seated within the electronic shelf. The rotation of the bail 32 may be implemented by a craft person who causes the attached horizontal rod 46 to be rotated out, up and away from the circuit boards. This will of course cause not only the illustrated bail 32 to be rotated as shown, but will also cause all of the bales associated with each of the circuit boards to be similarly rotated. This rotation causes the first portion of the fiber 20 to extend away from the recessed wall 22 towards the distal end 42 of the bail. The length of the fiber is sufficiently long to permit the bail to be rotated as indicated by arrow 48 to a position in which all of the bail 32 is above the horizontal line formed by extending the top edge of the circuit board 10. The first portion of the optical cable when pulled forwardly away from the recessed wall of the front faceplate by the bail in its extended position lies between a first and second plane, the first and second planes being parallel to a plane defined by the circuit board 10, the first plane intersecting one vertical edge 49 (see FIG. 3) of the front faceplate and the second plane intersecting the other vertical edge 51 of the front faceplate. This permits the illustrated circuit board 10 (or any of the other circuit boards in the same electronic shelf having bales connected to rod 46) to be removed by sliding the circuit board forward within the slot defined by rail 14. In this extended position as shown in FIG. 2, the bales associated with each circuit board cause the respective fibers to be extended substantially in front of and above the respective faceplates so that none of the first or second portions of the fibers associated with other circuit boards interferes with the removal of a particular circuit board. If the circuit board to be removed is to be completely removed from the slot by a substantial distance, i.e. longer than the extended first portion of the fiber relative to the distal end 42 of the extended bail, then the fiber associated with the removed circuit board must be disconnected at connector 18 from the optical transceiver 16. Preferably the support member 44, i.e. an exemplary means for holding the fiber, is movable about the distal end 42 of bail 32 so as to permit the fiber at the support member to move and/or twist as the bail is moved from one of the seated and extended positions to the other position. This minimizes strains and stresses on the fiber at the point of support by the support member 44.

FIG. 3 is a front view of the embodiment in which the circuit board 10 of FIG. 1 is shown seated within an electronic shelf adjacent other similarly configured circuit board assemblies. The second portion 50 of fiber 20 is shown exiting horizontally to the left of the front faceplate 12. The second portion 50 of the optical fiber extends substantially perpendicular to a plane defined by circuit board 10 when the bail is in the seated and extended positions. The electronic shelf includes top and bottom horizontal support members 52 and 54, respectively.

Figure 5:
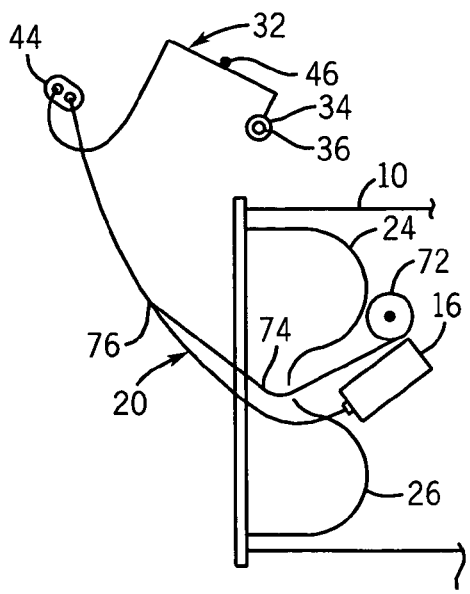
FIG. 5 is a side elevational view illustrating another embodiment of the present invention.

FIGS. 4 and 5 illustrate embodiments similar to the embodiment shown in FIGS. 1–3 wherein the same reference numerals are used to identify like elements. In order to better illustrate the differences contained in the embodiment shown in FIGS. 4 and 5, not all reference numerals of elements that are in common with the embodiment shown in FIGS. 1–3 are shown.

In FIG. 4 the bail 32 is shown in its extended position similar to the embodiment of FIG. 2. Spring-loaded retractable pulleys 60 and 62 contain strings or filaments 64 and 66, respectively, that are attached to the optical fiber 20 at locations 68 and 70, respectively. The pulleys are preferably located rearward of the rearward recessed wall 22. The spring-loaded pulleys maintain tension on the extended filaments 64 and 66 which in turn create a force on the optical fiber 20 that assists to automatically pull the optical fiber back into a seated position such as shown in FIG. 1 as the bail 32 is returned to its seated position. Small holes in the recessed wall permit the passage of the filaments 64 and 66.

In FIG. 5 the bail 32 is shown in its extended position similar to the embodiment of FIG. 2. In this embodiment a spring-loaded pulley 72 contains a filament 74 that provides tension on optic fiber 20 at its attachment point 76 in the extended position. The force exerted on optic fiber 20 by filament 74 assists to automatically pull the optic fiber back into a seated position such as shown in FIG. 1 as the bail 32 is returned to its seated position as shown in FIG. 1.

Figure 6:
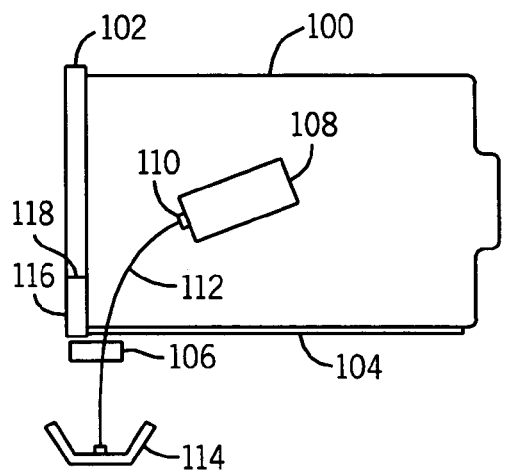
FIG. 6 is a side elevational view illustrating a different embodiment of the present invention.
Figure 7:
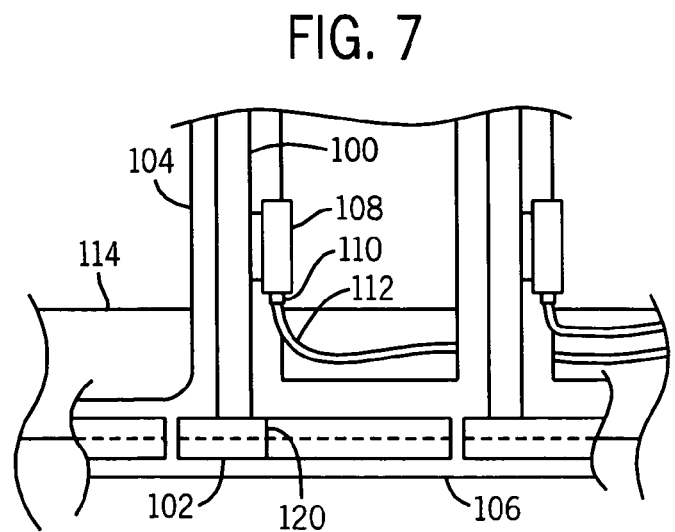
FIG. 7 is a partial top view of the embodiment of the present invention as shown in FIG. 6.

FIGS. 6 and 7 illustrate an alternative embodiment for routing optical fiber that exits near the front of a circuit board seated in an electronic shelf. Circuit board 100 is attached to a front faceplate 102 and is slidingly supported by horizontal rail 104 that is part of the electronic shelf. A front supporting frame member 106 of the electronic shelf runs transverse to the plane of the circuit board 100. An optical transceiver 108 is mounted to circuit board 100 and is coupled by connector 110 to optical cable 112. The optical transceiver provides an input/output interface between information carried by electrical signals on circuit board 100 and information encoded as modulated light carried by optical fiber 112. An elongated tray 114 is preferably disposed below the connector 110 of the optical transceiver 108, and maybe disposed below the level of the rail 104 as shown in the illustrative embodiment. The faceplate 102 preferably includes a slot 116 bounded by an upper horizontal edge 118 and a left vertical edge 120 (see FIG. 7) defining an opening on the lower, right side (as seen from the front) of the faceplate. The slot is dimensioned to allow access to the connector 110 through the slot in the faceplate so the fiber can be connected and disconnected from the transceiver 108 with the board in the installed position. The fiber 112 can be draped through the slot as the board 100 is removed and inserted. The slot is preferably filled while the board is in the installed position, e.g. with a snap-on or hinged metal plate, to inhibit radio frequency energy from being radiated through the slot.

As best seen in top view FIG. 7, the optical fiber 112 exits near the front of circuit board 100 by traveling downward prior to reaching the front faceplate 102 and behind the front supporting member 106 of the electronic shelf. The elongated tray 114 extends horizontally below support member 106 and transverse to the plane of circuit board 100. The tray 114 is sufficiently wide to accommodate a plurality of optical fibers from the circuit boards that will be seated in the electronic shelf. The optic fiber 112 is disposed within the tray 114 so that there is sufficient slack in the optic fiber to permit the circuit board 100 to be slid forward along the rail 104 so that a craft person can gain access to the connector 110 and remove the optic fiber from the transceiver 108 thereby permitting the circuit board 100 to be totally removed from the electronic shelf. If the tray 114 cannot be utilized to provide sufficient slack to allow for insertion and/or removal of the fiber 112 from the transceiver 108, then slack can be achieved by coiling the fiber in a reserved cavity, such as the half dog bone shaped cavity described in FIG. 1.

Although embodiments of the present invention have been described above and shown in the drawings, various modification changes can be made by those skilled in the art without departing from the scope of the present invention. For example, the bails can be positioned at different locations and/or have different physical configurations consistent with positioning the optical fibers appropriately in seated and extended positions. Likewise, a variety of tensioning devices other than spring-loaded pulleys could be utilized to assist in or automatically cause the optical fiber to return to its seated position from an extended position. Although the half dog bone shape associated with the rearward recess helps to accommodate the positioning of the optical fiber and bend radius control in a seated position, other cross-sectional shapes could be utilized consistent with accommodating the required length of optic fiber to be stored during its seated position and accommodating the minimum bend radii required for the optic fiber.

The scope of the present invention is defined by the claims that follow, and is not limited to the specific embodiments described in detail above.

What is claimed is:

1. An electronic shelf comprising:
   circuit boards slidingly received in the electronic shelf;
   a front faceplate attached to a first circuit board;
   the front faceplate having a recessed wall that defines a rearward extending recess between a bottom edge and a top edge of the first circuit board;
   an optical fiber connected to the first circuit board;
   a bail mounted adjacent the front faceplate, the bail being movable from a seated position to an extended position;
   means for holding the optical fiber at an intermediate location along a length of the optical fiber at a first location on the bail;
   the optical fiber having a first portion that is contained within the rearward extending recess with the bail in its seated position;
   the first portion of the optical fiber being pulled forwardly from within the recess and away from the front faceplate with the bail in its extended position.

2. The electronic shelf of claim 1 wherein no portion of the bail extends below a horizontal line defined by a top edge of the first circuit board when the bail is in its extended position.

3. The electronic shelf of claim 2 wherein the first portion of the optical cable when pulled forwardly away from the front faceplate with the bail in its extended position lies between a first and second plane, the first and second planes being parallel to a plane defined by the first circuit board, the first plane intersecting one vertical edge of the front faceplate and the second plane intersecting the other vertical edge of the front faceplate.

4. The electronic shelf of claim 1 wherein at least a portion of the front faceplate lies within a plane that is perpendicular to a plane defined by the first circuit board.

5. The electronic shelf of claim 1 further comprising a second portion of the optical fiber, the second portion beginning at the intermediate location of the optical fiber and extending away from the first circuit board, the second portion of the optical fiber extending substantially perpendicular to a plane defined by the first circuit board when the bail is in the seated and extended positions.

6. The electronic shelf of claim 1 further comprising means for pivotally mounting the bail, the pivotally mounting means disposed above a horizontal plane that intersects a top edge of the first circuit board.

7. An electronic shelf comprising:
a plurality of circuit board assemblies mounted adjacent each other, each circuit board assembly including:
a circuit board;
a front faceplate attached to the circuit board;
the front faceplate having a recessed wall that defines a rearward extending recess between a bottom edge and a top edge of the circuit board; and
an optical fiber connected to the circuit board; the electronic shelf further comprising:
a bail mounted adjacent each of the front faceplates, each bail being movable from a seated position to an extended position;
means for holding each optical fiber at an intermediate location along a length of the optical fiber at a first location on the associated bail;
each optical fiber having a first portion that is contained within the rearward extending recess with the associated bail in its seated position;
the first portion of the optical fiber being pulled forwardly from within the recess and away from the associated front faceplate with the associated bail in its extended position.

8. The electronic shelf of claim 7 further comprising means for attaching the bails to each other so that all of the bails move in unison between the seated and extended positions.

9. The electronic shelf of claim 8 wherein the means for attaching the bails to each other comprises a rigid rod attached to each bail.

10. The electronic shelf of claim 7 wherein no portion of the bails extend below a horizontal plane defined by the top edges of the circuit boards when the bails are in the extended position.

11. The electronic shelf of claim 10 wherein the first portion of the optical cable when pulled forwardly away from the front faceplate with the associated bail in its extended position lies between a first and second plane, the first and second planes being parallel to a plane defined by the circuit boards, the first plane intersecting one vertical edge of the associated front faceplate and the second plane intersecting the other vertical edge of the associated front faceplate.

12. The electronic shelf of claim 7 wherein at least a portion of each of the front faceplate lies within a plane that is perpendicular to a plane defined by the associated circuit board.

13. The electronic shelf of claim 7 further comprising each optical fiber having a second portion that begins at the intermediate location of the optical fiber and extending away from the associated circuit board, the second portion of the optical fiber extending substantially perpendicular to a plane defined by the associated circuit board when the associated bail is in the seated and extended positions.

14. The electronic shelf of claim 8 further comprising means for pivotally mounting the bails, the pivotally mounting means disposed above a horizontal plane that intersects a top edge of the circuit boards.

15. The electronic shelf of claim 1 wherein the recessed wall defines a rearward extending recess having a half dog bone cross section with first and second bulging portions dimensioned to accommodate minimum turn radii of the optical fiber.

16. The electronic shelf of claim 7 wherein the recessed wall defines a rearward extending recess having a half dog bone cross section with first and second bulging portions dimensioned to accommodate minimum bend radii of the optical fiber.

17. The electronic shelf of claim 1 further comprising a cabinet with a front door enclosing the circuit board assemblies, the front door disposed a short distance from the front faceplate.

18. The electronic shelf of claim 7 further comprising a cabinet with a front door enclosing the circuit board assemblies, the front door disposed a short distance from the front faceplate.

19. An electronic shelf comprising:
circuit boards slidingly received in the electronic shelf;
a front faceplate attached to a first circuit board;
the front faceplate having a slot near the lower edge of the front faceplate;
an optical fiber connected to the first circuit board;
an elongated tray extending below the first circuit board and substantially perpendicular to the plane of the first circuit board;
the tray positioned to support a length of the optical fiber;
the slot in the front faceplate dimensioned to permit the optical fiber to pass there through while the first circuit board is inserted and removed from an installed position in the electronic shelf.

20. The electronic shelf of claim 19 further comprising means for preventing the passage of radiated radio frequency energy through the slot in the front faceplate while the first circuit board is in the installed position in the electronic shelf.

* * * * *